United States Patent
Chilcote et al.

(10) Patent No.: US 7,271,584 B2
(45) Date of Patent: Sep. 18, 2007

(54) MAGNETIC SENSING APPARATUS

(75) Inventors: Jason M. Chilcote, Frisco, TX (US); Gregory R. Furlong, Freeport, IL (US); Joseph K. Murdock, Freeport, IL (US); Aaron J. Meyers, Cedarville, IL (US)

(73) Assignee: Honeywell International Inc., Morristown, NJ (US)

( * ) Notice: Subject to any disclaimer, the term of this patent is extended or adjusted under 35 U.S.C. 154(b) by 216 days.

(21) Appl. No.: 11/178,654

(22) Filed: Jul. 9, 2005

(65) Prior Publication Data

US 2007/0007951 A1    Jan. 11, 2007

(51) Int. Cl.
*G01B 7/30* (2006.01)
*G01R 33/07* (2006.01)

(52) U.S. Cl. .............................. 324/207.25; 324/207.2; 324/251

(58) Field of Classification Search ............. 324/207.2, 324/207.13, 207.25, 251; 73/514.31, 514.39
See application file for complete search history.

(56) References Cited

U.S. PATENT DOCUMENTS

| | | | |
|---|---|---|---|
| 5,119,166 A | 6/1992 | Sridhar | 357/60 |
| 5,572,058 A | 11/1996 | Biard | 257/421 |
| 5,644,127 A | 7/1997 | Ohmae | |
| 6,492,697 B1 | 12/2002 | Plagens et al. | 257/426 |
| 6,812,694 B2 * | 11/2004 | Uenoyama | 324/207.22 |

FOREIGN PATENT DOCUMENTS

GB    2330889 A    5/1999

* cited by examiner

*Primary Examiner*—Bot LeDynh
(74) *Attorney, Agent, or Firm*—Kermit D. Lopez; Luis M. Ortiz

(57) ABSTRACT

A magnetic sensing apparatus includes a first magnetic transducer separated spatially from a second magnetic transducer and proximate to a target and a direction decoding circuit associated with the first and second magnetic transducers, wherein the direction decoding circuit produces output pulses that provide data indicative of a rotation of the target while rejecting rotational vibration signals associated with the target during a rotational detection of the target utilizing the first and second magnetic transducers without producing erroneous output pulses or missing an excessive number of the output pulses during speed and rotational detection operations thereof.

18 Claims, 3 Drawing Sheets

US 7,271,584 B2

MAGNETIC SENSING APPARATUS

TECHNICAL FIELD

Embodiments are generally related to sensing devices and techniques. Embodiments are also related to rotational sensing devices and systems. Embodiments are additionally related to magnetic sensors and magnetoresistive components thereof.

BACKGROUND OF THE INVENTION

Various sensors are known in the magnetic-effect sensing arts. Examples of common magnetic-effect sensors may include, for example, Hall Effect and magnetoresistive technologies. Generally, these magnetic-effect sensors can respond to the change of magnetic field as influenced by the presence or absence of a ferromagnetic target object of a designed shape that passes through or by the sensory field of the magnetic-effect sensor.

When acting as a transducer, the magnetic-effect sensor generally outputs an electrical signal representative of the sensed magnetic field. The electrical signal can vary in amplitude and width so as to correspond to the shape, e.g., a profile, of the target object. The signal can be modified by various electronic circuitries for processing and conditioning so as to yield sensing and control information. The various electronics may be positioned either onboard or outboard of the magnetic-effect sensor's packaging.

One of the problems with detecting targets, particularly rotational targets (e.g., a rotating shaft), and using magnetic sensing devices is that such targets typically possess a large amount of rotational vibration or jitter along with wobble or run-out. Such features can distort the output signals generated by the magnetic sensor utilized, thereby producing erroneous output pulses or resulting in missing an excessive number of output pulses. A need thus exists for a magnetic sensing apparatus, which is not plagued with such problems.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is, therefore, one aspect of the present invention to provide for an improved magnetic sensor.

It is another aspect of the present invention to provide for a rotational sensor.

It is yet a further aspect of the present invention to provide for a magnetic sensing apparatus for target wheels having large wobble and rotational vibration.

The aforementioned aspects and other objectives and advantages can now be achieved as described herein. A magnetic sensing apparatus is described herein, which includes a first magnetic transducer separated spatially from a second magnetic transducer and proximate to a target. The magnetic sensing apparatus further includes a direction decoding circuit associated with the first and second magnetic transducers, wherein the direction decoding circuit produces output pulses that provide data indicative of a rotation of the target while rejecting rotational vibration signals associated with the target during a rotational detection of the target utilizing the first and second magnetic transducers without producing erroneous output pulses or missing an excessive number of the output pulses during speed and rotational detection operations thereof.

The direction decoding circuit can be configured to include a first sub-circuit associated with the first magnetic transducer, wherein the first sub-circuit comprises a first amplifier in association with a first peak detector and a first comparator, and a second sub-circuit associated with the second magnetic transducer, wherein the second sub-circuit comprises a second amplifier in association with a second peak detector and a second comparator, wherein the first and second sub-circuits generate output pulses respectively associated with the first and second magnetic transducers. Additionally, a peak detector reset circuit can be incorporated into the direction decoding circuit that prevents the direction decoding circuit from missing the excessive number of the output pulses during speed and rotational detection operations thereof.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles embodied therein.

DETAILED DESCRIPTION

The particular values and configurations discussed in these non-limiting examples can be varied and are cited merely to illustrate at least one embodiment of the present invention and are not intended to limit the scope thereof.

Figure 1:
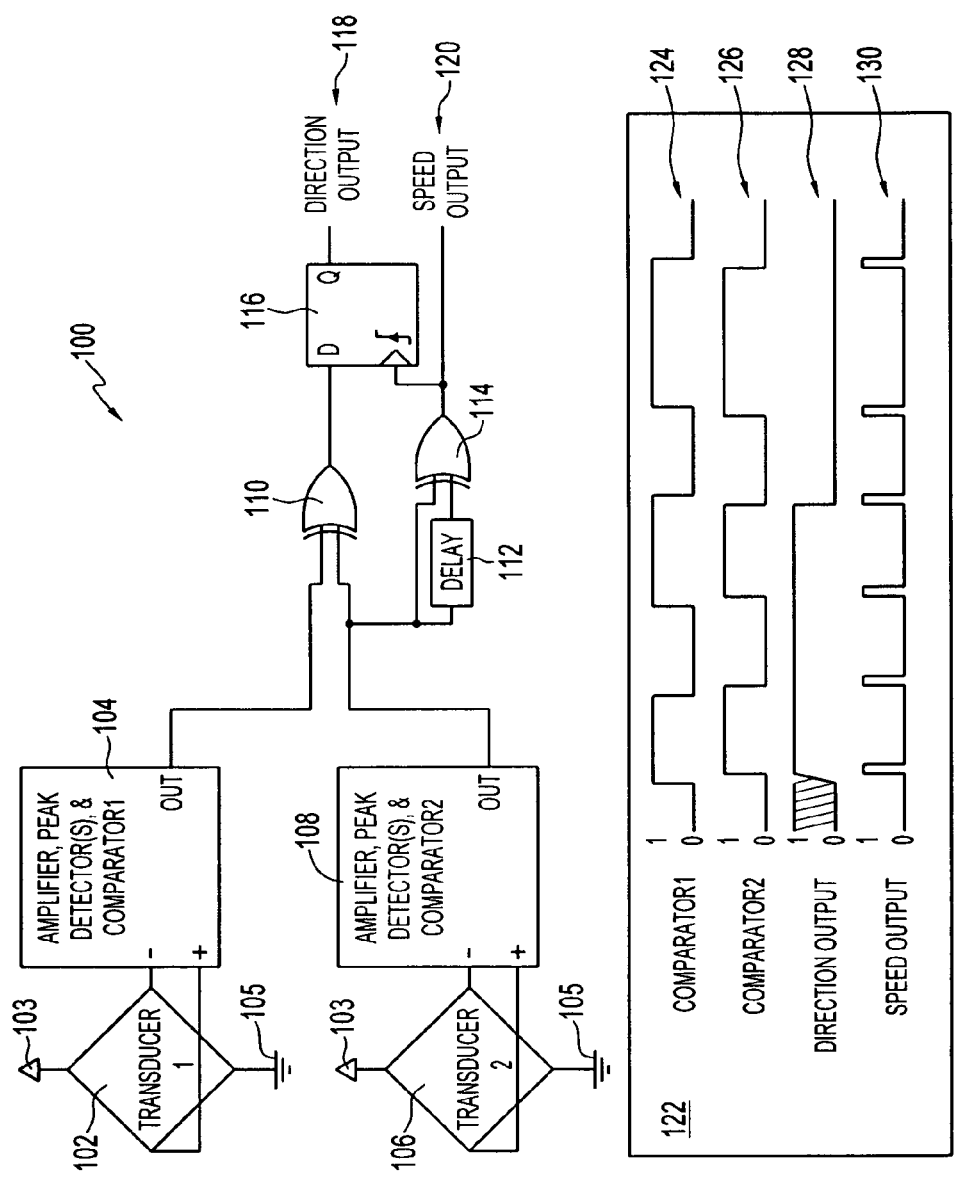
FIG. 1 illustrates a prior art direction decoding circuit.

FIG. 1 illustrates a prior art direction decoding circuit 100 that includes a first magnetic transducer 102 connected to power ($V_{cc}$) 103 and ground 105. Note that apparatus 100 is described and depicted herein for illustrative and edification purposes only and is not considered a limitation to the preferred embodiment also described herein. Also note that in FIGS. 1-2, identical or similar parts or elements are generally indicated by identical reference numerals.

In general, the first magnetic transducer 102 is connected to a first sub-circuit 104 that includes a first amplifier in association with a first peak detector and a first comparator. Circuit 100 additionally includes a second sub-circuit 108 associated a second magnetic transducer 106, which is also connected to ground 105 and power 103. The first and second sub-circuits 104 and 108 generate output pulses, which are fed to a logic gate 110 and a logic gate 114. Note that logic gate 114 can function as a dual edge detector that receives at least one signal from sub-circuit 108 via a delay circuit 112.

Output from logic gates 110 and 114 is then fed to a D-type Flip Flop circuit 116 that generates direction output data 118 when a speed output 120 rising edge occurs.

Decoding circuit 100 represents a standard decoding circuit. When the comparator edges from the first magnetic transducer 102 lead those from the second magnetic transducer 106, the direction output 118 is high. Note that respective first and second comparator outputs 124 and 126 are depicted in FIG. 1 within block 122.

When the comparator edges from the first magnetic transducer 102 lag those from the second magnetic transducer, the direction output 118 is low. Note that output pulse signals associated with direction output 118 are depicted in block 122 as direction output signals 128. A speed output signal 130 is also depicted in block 122, which is associated with data generated at said speed output 120. A speed output pulse occurs on every comparator edge signal 126 associated with said second magnetic transducer. One of the problems with apparatus 100 when applied in the context of magnetic rotational sensing operations is that a typical sensed target can generate a great deal of rotational vibration (or jitter) and wobble (or run-out) thereby producing erroneous output pulses and/or missing an excessive number of output pulses.

Figure 2:
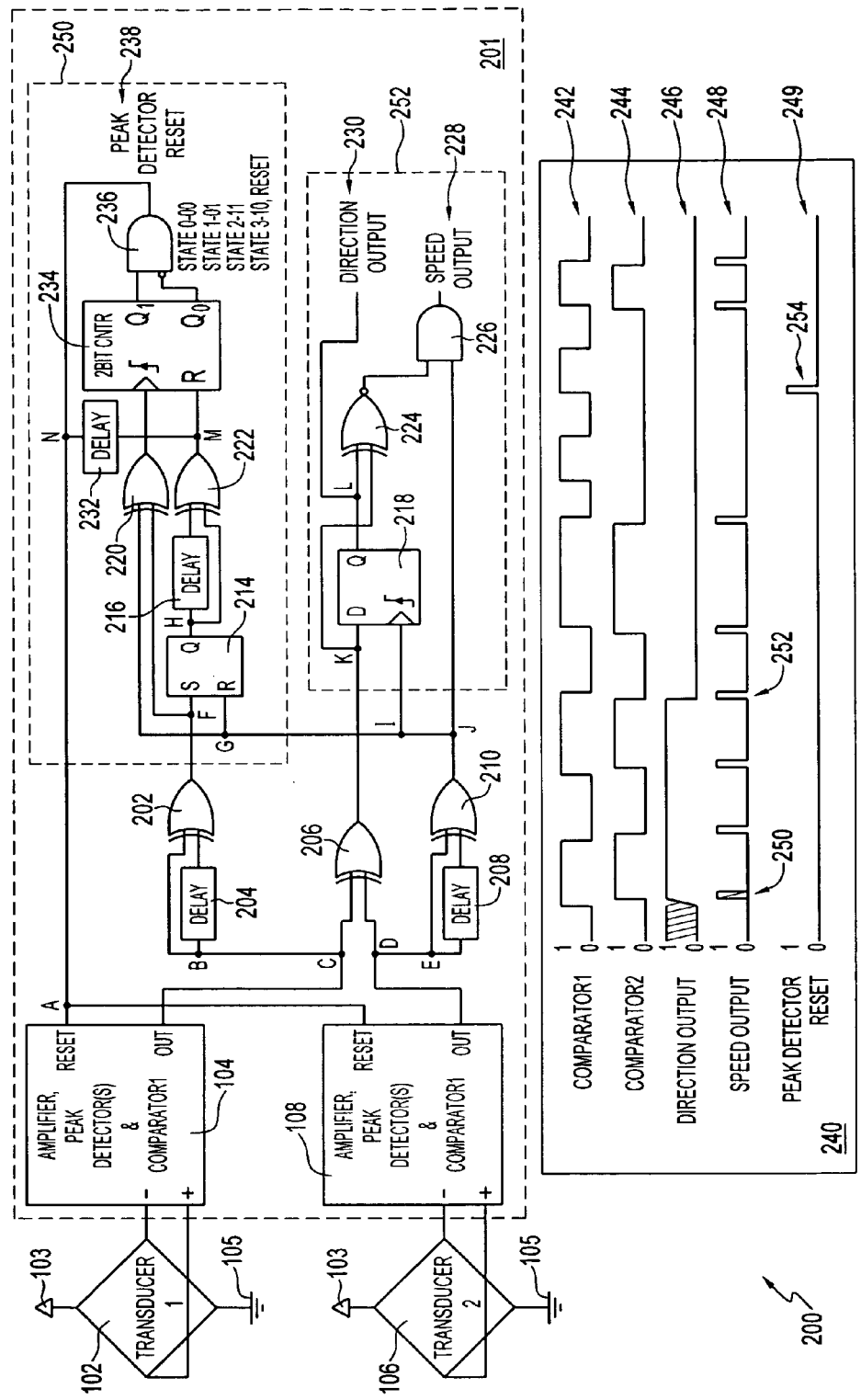
FIG. 2 illustrates a magnetic sensing apparatus, which can be implemented in accordance with a preferred embodiment.

FIG. 2 illustrates a magnetic sensing apparatus 200, which can be implemented in accordance with a preferred embodiment. Magnetic sensing apparatus 200 solves the problems associated with apparatus 100 in that the electrical circuit configuration of apparatus 200 can be utilized to sense a target (e.g., a target wheel) that possesses a large amount of rotational vibration/jitter and wobble/run-out without producing erroneous output pulses or missing an excessive number of output pulses. The magnetic sensing apparatus 200 depicted in FIG. 2 generally includes first magnetic transducer 102 separated spatially from second magnetic transducer 106 and proximate to a target (not shown in FIG. 2).

Magnetic sensing apparatus 200 also includes a direction decoding circuit 201, which is indicated in FIG. 2 by dashed lines. The direction decoding circuit 201 is associated with said first and second magnetic transducers 102 and 106. The direction decoding circuit 201 produces output pulses that provide data indicative of the rotation of the target while rejecting rotational vibration signals associated with said target during a rotational detection of said target utilizing said first and second magnetic transducers 102 and 106, without producing erroneous output pulses or missing an excessive number of said output pulses during speed and rotational detection operations thereof.

Note that magnetic transducers 102 and 106 can be implemented as magnetoresistive sensing components as an example, or Hall Effect elements, depending upon design considerations. One example of a Hall Effect element that can be adapted for use with the embodiments discussed herein is disclosed in U.S. Pat. No. 6,492,697, entitled "Hall-Effect Element with Integrated Offset Control and Method for Operating Hall-Effect Element to Reduce Null Offset," which issued to Plagens et al on Dec. 10, 2002 and is assigned to Honeywell International Inc. U.S. Pat. No. 6,492,697 is incorporated herein by reference.

The direction decoding circuit 201 generally included a first sub-circuit 104 associated with said first magnetic transducer 102, wherein said first sub-circuit 104 comprises a first amplifier in association with a first peak detector and a first comparator. The direction decoding circuit 201 also includes a second sub-circuit 108 associated with said second magnetic transducer 106, wherein said second sub-circuit 108 comprises a second amplifier in association with a second peak detector and a second comparator, wherein said first and second sub-circuits 104 and 108 generate output pulses respectively associated with said first and second magnetic transducers 102 and 106. As indicated in FIG. 2, the first magnetic transducer 102 is also connected to power 103 and ground 105. Similarly, second magnetic transducer 106 is also connected to power 103 and 105.

The direction decoding circuit 201 also includes a peak detector reset circuit 250 that prevents said direction decoding circuit from missing said excessive number of said output pulses during speed and rotational detection operations thereof. The peak detector reset circuit 250 is generally composed of a set-reset latch circuit 214, which provides a "Q" output at node H, which in turn is connected to the input of a delay circuit 216 and a logic gate 222. The set input to sub-circuit 214 at node F is also connected to the input of a logic gate 216 in addition to a reset input at node G. Output from logic gate 222 is provided at node M, which is connected to a delay circuit 232, whose output is connected to node N. The output from logic gate 220 is fed as the clock input to counter circuit 234. Additionally, the output from logic gate 222 at node M is also connected to the reset input of counter circuit 234. A Q1 and a Q0 output from counter circuit 234 are fed as input to a logic gate 236, whose output provides a peak detector reset 238 when a specific number of edges are seen from a comparator causing the counter 234 to increment without any edges from the opposite comparator causing the counter 234 to provide a reset. Note that counter circuit 234 can be implemented in the context of any number of bits, depending upon design considerations. In the current embodiment, however, a 2-bit counter circuit is presented for general illustrative purposes but is not considered a limiting feature thereof.

The direction decoding circuit 201 further includes a logic gate 202 to provide dual edge detection for the other comparator 104 having one input connected to the output of a delay circuit 204 and another input connected to a node B, which in turn is connected to a node C (i.e., electrically, node B and node C comprise the same node). Node C is in turn connected to the output of sub-circuit 104. Note that the sub-circuit 104 also includes a reset pin at node A to which reset signals can be applied. Node A is connected to node N of the peak detector reset circuit 250. In this manner, reset signals can be provided at node A. Note that node A is also connected to a reset pin associated with sub-circuit 108. Output from sub-circuit 108 is also connected to a node D and a node E. Node D is provided as input to a logic gate 106 along with node C. Additionally, node E is connected to an input of logic gate 210. Node E is also connected to an input of a delay circuit 208 whose output is connected to an input of logic gate 210.

Counter circuit 234 functions as a reset counter. When the reset counter circuit 234 attains a given count, a reset can be applied to the peak detectors associated with sub-circuits 104 and 108. Note that specific peak detectors are not illustrated in FIG. 1 but are presumed to fall within the general confines and context of the blocks representing sub-circuits 104 and 108. The count is then incremented on each edge of either comparator output associated with sub-circuits 104 and 108. The count is then reset after each edge that results from an alternate comparator output and represents a standard operating mode. If a given number (e.g., 3 in this particular embodiment) of consecutive non-alternating edges originate from a single comparator output, this indicates that the other comparator is not functioning properly and a peak detector reset signal must be applied. This comparator malfunction could be due to a large dynamic air gap jump of the target, wobble or runout.

The direction decoding circuit 201 also includes a sub-circuit 252, which includes a D-type flip flop circuit 218 whose "D" input is connected to a node K, which in turn is connected to the output of logic gate 206. A node I is also connected to a node J, which in turn is connected to the output logic gate 210. Node I is connected to an input of counter circuit 218 and also to a node G, which is connected to the reset input of sub-circuit 214. Node K is further connected to an input logic gate 224, which also includes an input connected to node L. A "Q" output from D-type flip flop circuit 218 is connected to node L. A direction output pin 230 that provides direction output pulse signals can be connected to node L. The output from logic gate 224 is also connected to an input of a logic gate 226 whose output provides a speed output pin 228 from which speed output pulse signals can be obtained. Note that node J connected to the output of logic gate 210 can also be input to logic gate 226 along with the output from logic gate 224. In general, additional logic gates 224 and 226 following the prior art decoding logic gates 206, 210, and 218 allow for the generation of speed output pulse signals at a speed output pin 228 only when the decoded direction is equal to the previously decoded direction.

FIG. 2 also illustrates a block 240 that depicts a variety of pulse signals associated with the magnetic sensing apparatus 200. For example, first comparator pulse signals 242 are depicted in block 240 in association with second comparator pulse signals 244. A direction output signal 246 taken from the direction output pin 230. A speed output signal 246 is also indicated in block 240 and can be derived from the speed output pin 228. Note that pulse 250 of speed output signal 248 indicates that the pulse is power-up dependent, while pulse 252 indicates that the first pulse after a direction reversal is eliminated. A peak detector reset signal 249 is additionally depicted in block 240 of FIG. 2. A pulse 254 of the peak detector reset signal 248 indicates that a reset occurs after 3 consecutive edges on one comparator with no edges seen on the other.

The magnetic sensing apparatus 200 solves the rotational vibration problem discussed earlier by implementing an improved direction decoding circuit 201 that eliminates a first output pulse after a direction reversal is decoded using the two spatially separated magnetic transducers. Two consecutive target edges of a target 300 (i.e., see target 300 depicted in FIGS. 3-4) are required to be decoded in order to show the same direction prior to providing an output pulse. To prevent the magnetic sensing apparatus 200 from missing an excessive number of output pulses from target wheel wobble (or run-out), the peak detector reset circuit is provided, which resets adaptive peak detectors associated with the magnetic sensing apparatus that no longer store an appropriate peak signal value.

This situation can occur when the target wheel (e.g., target 300), for example, begins to rotate at the time the air-gap (e.g., see air-gap 402 depicted in FIG. 4) suddenly increases. During such a scenario, one magnetic transducer may provide an output while the other does not. If this condition persists, wherein one transducer does not provide an output while the other does, a peak detector reset signal can be applied after a given number of pulses appear from the switching transducer. Such a configuration prevents peak detectors from continuing to store signal levels that are no longer valid. During normal alternating transducer comparator switching, however, the reset circuit is inactive.

Figure 5:
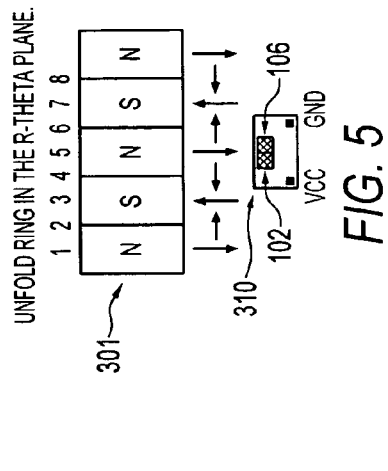
FIG. 5 illustrates a sectional view of a magnetic sensing ring magnet, which can be implemented in accordance with one embodiment.
Figure 6:
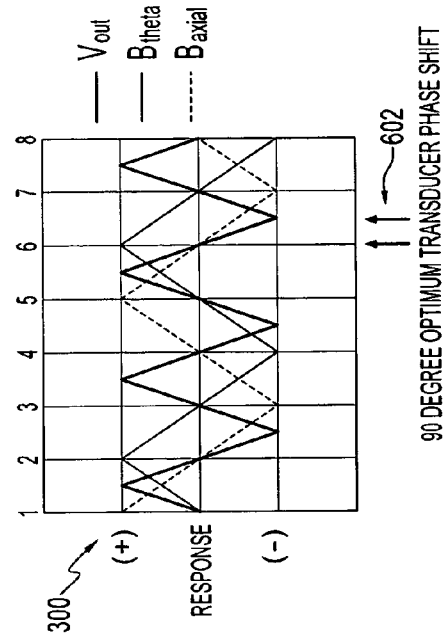
FIG. 6 illustrates a graph depicting an output response in accordance with one embodiment.
Figure 3:
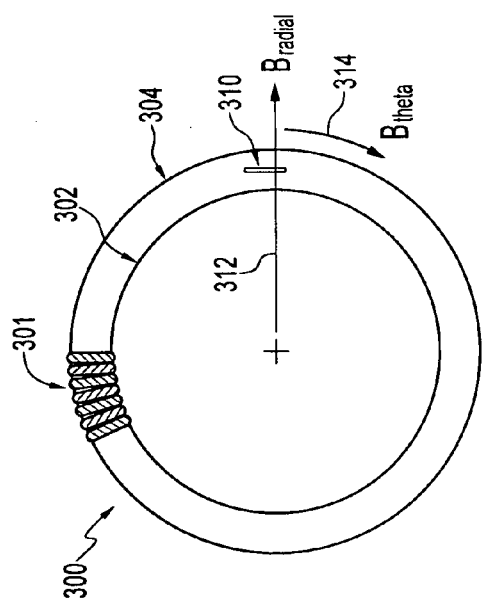
FIG. 3 illustrates a top view of a target that can be implemented in accordance with one embodiment.
Figure 4:
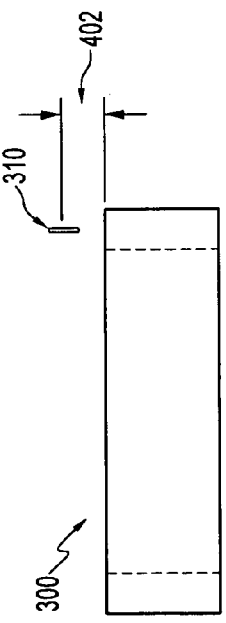
FIG. 4 illustrates a side view of the target depicted in FIG. 3 in accordance with one embodiment.

FIG. 3 illustrates a top view of a target 300 that can be implemented in accordance with one embodiment. FIG. 4 illustrates a side view of the target 300 depicted in FIG. 3 in accordance with one embodiment. FIG. 5 illustrates a sectional view of a magnetic sensing ring magnet 301, which can be implemented in accordance with one embodiment. Finally, FIG. 6 illustrates a graph 600 depicting an output response in accordance with one embodiment. Note that in FIGS. 2-6, identical or similar parts or elements are generally indicated by identical reference numerals. Thus, target 300 includes a target inner diameter 302 and a target outer diameter 304.

An integrated circuit 310 is depicted in FIGS. 3-5 with respect to target 300. In FIG. 3, arrow 312 generally represents the $B_{radial}$, while arrow 314 represents the $B_{theta}$. The axial air gap distance of air gap 402 is also depicted in FIG. 4. Air gap 402 may have a length of, for example, 0.5 mm-02 mm. Note that target 300 can be implemented in accordance with the configuration depicted in FIG. 2. In FIG. 6, arrows 602 generally represent a 90 degree optimum transducer phase shift.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A magnetic sensing apparatus, comprising:
   a first magnetic transducer separated spatially from a second magnetic transducer and proximate to a target; and
   a direction decoding circuit associated with said first and second magnetic transducers, wherein said direction decoding circuit produces output pulses that provide data indicative of a rotation of said target while rejecting rotational vibration signals associated with said target during a rotational detection of said target utilizing said first and second magnetic transducers without producing erroneous output pulses or missing an excessive number of said output pulses during speed and rotational detection operations thereof, said direction decoding circuit comprising a peak detector reset circuit that prevents said direction decoding circuit from missing said excessive number of said output pulses during speed and rotational detection operations thereof.

2. The magnetic sensing apparatus of claim 1 wherein said direction decoding circuit comprises:
   a first sub-circuit associated with said first magnetic transducer, wherein said first sub-circuit comprises a first amplifier in association with a first peak detector and a first comparator; and
   a second sub-circuit associated with said second magnetic transducer, wherein said second sub-circuit comprises a second amplifier in association with a second peak detector and a second comparator, wherein said first and second sub-circuits generate output pulses respectively associated with said first and second magnetic transducers.

3. The magnetic sensing apparatus of claim 1 wherein said direction decoding circuit comprises:
   a first sub-circuit associated with said first magnetic transducer, wherein said first sub-circuit comprises a first amplifier in association with a first peak detector and a first comparator;
   a second sub-circuit associated with said second magnetic transducer, wherein said second sub-circuit comprises a second amplifier in association with a second peak detector and a second comparator, wherein said first and second sub-circuits generate output pulses respectively associated with said first and second magnetic transducers; and a peak detector reset circuit that prevents said direction decoding circuit from missing said excessive number of said output pulses during speed and rotational detection operations thereof.

4. The magnetic sensing apparatus of claim 1 wherein said peak detector reset circuit comprises a plurality of logic gates that receive output pulses generated by said first and second sub-circuits, wherein said plurality of logic gates allow output signals indicative of speed to be generated only when decoded directional data associated with said target generated by said direction decoding circuit is equivalent to a previously decoded directional data associated with said target.

5. The magnetic sensing apparatus of claim 1 wherein said peak detector reset circuit comprises:
   a reset counter wherein when said reset counter achieves a particular count, a reset signal is automatically applied to said peak detector reset circuit and said count is then incremented on each edge of output pulses generated by said first or second comparators of said respective first and second sub-circuits; and
   wherein said count is reset after each edge thereof that results from an alternate comparator output generated by said first or second comparators during a standard operating mode; and
   wherein when a particular number of consecutive non-alternating edges originate from a single comparator output of said first or second comparators, an indication that at least one of said first or second comparators is stalled and a need for an application of said peak reset signal to said peak detector reset circuit is necessary.

6. The magnetic sensing apparatus of claim 1 wherein said direction decoding signal generates a plurality of varying output pulses indicative of a speed and a direction associated with said target.

7. The magnetic sensing apparatus of claim 1 wherein said first and second magnetic transducers comprise magnetoresistive detection components.

8. The magnetic sensing apparatus of claim 1 wherein said first and second magnetic transducers comprise Hall effect components.

9. The magnetic sensing apparatus of claim 1 wherein said target comprises a ferromagnetic material.

10. A magnetic sensing apparatus, comprising:
   a first magnetic transducer separated spatially from a second magnetic transducer and proximate to a target comprising a ferromagnetic material;
   a direction decoding circuit associated with said first and second magnetic transducers, wherein said direction decoding circuit comprises:
   a peak detector reset circuit that prevents said direction decoding circuit from missing said excessive number of said output pulses during speed and rotational detection operations thereof
   a first sub-circuit associated with said first magnetic transducer, wherein said first sub-circuit comprises a first amplifier in association with a first peak detector and a first comparator; and
   a second sub-circuit associated with said second magnetic transducer, wherein said second sub-circuit comprises a second amplifier in association with a second peak detector and a second comparator, wherein said first and second sub-circuits generate output pulses respectively associated with said first and second magnetic transducers, such that said direction decoding circuit produces output pulses that provide data indicative of a rotation of said target while rejecting rotational vibration signals associated with said target during a rotational detection of said target utilizing said first and second magnetic transducers without producing erroneous output pulses or missing an excessive number of said output pulses during speed and rotational detection operations thereof.

11. The magnetic sensing apparatus of claim 10 wherein said peak detector reset circuit comprises a plurality of logic gates that receive output pulses generated by said first and second sub-circuits, wherein said plurality of logic gates allow output signals indicative of speed to be generated only when decoded directional data associated with said target generated by said direction decoding circuit is equivalent to a previously decoded directional data associated with said target.

12. The magnetic sensing apparatus of claim 10 wherein said peak detector reset circuit comprises:
   a reset counter wherein when said reset counter achieves a particular count, a reset signal is automatically applied to said peak detector reset circuit and said count is then incremented on each edge of output pulses generated by said first or second comparators of said respective first and second sub-circuits; and
   wherein said count is reset after each edge thereof that results from an alternate comparator output generated by said first or second comparators during a standard operating mode; and
   wherein when a particular number of consecutive non-alternating edges originate from a single comparator output of said first or second comparators, an indication that at least one of said first or second comparators is stalled and a need for an application of said peak reset signal to said peak detector reset circuit is necessary.

13. The magnetic sensing apparatus of claim 10 wherein said direction decoding signal generates a plurality of varying output pulses indicative of a speed and a direction associated with said target.

14. A magnetic sensing method, comprising:
   providing a first magnetic transducer separated spatially from a second magnetic transducer and proximate to a target;
   associating a direction decoding circuit with said first and second magnetic transducers, wherein said direction decoding circuit produces output pulses that provide data indicative of a rotation of said target while rejecting rotational vibration signals associated with said target during a rotational detection of said target utilizing said first and second magnetic transducers without producing erroneous output pulses or missing an excessive number of said output pulses during speed and rotational detection operations thereof; and
   configuring said direction decoding circuit to comprise a peak detector reset circuit that prevents said direction decoding circuit from missing said excessive number of said output pulses during speed and rotational detection operations thereof.

15. The method of claim 14 further comprising configuring said direction decoding circuit to comprise:
   a first sub-circuit associated with said first magnetic transducer, wherein said first sub-circuit comprises a first amplifier in association with a first peak detector and a first comparator; and
   a second sub-circuit associated with said second magnetic transducer, wherein said second sub-circuit comprises a second amplifier in association with a second peak detector and a second comparator, wherein said first and second sub-circuits generate output pulses respectively associated with said first and second magnetic transducers.

16. The method of claim 14 wherein further comprising configuring said direction decoding circuit to comprises:
  a first sub-circuit associated with said first magnetic transducer, wherein said first sub-circuit comprises a first amplifier in association with a first peak detector and a first comparator;
  a second sub-circuit associated with said second magnetic transducer, wherein said second sub-circuit comprises a second amplifier in association with a second peak detector and a second comparator, wherein said first and second sub-circuits generate output pulses respectively associated with said first and second magnetic transducers; and
  a peak detector reset circuit that prevents said direction decoding circuit from missing said excessive number of said output pulses during speed and rotational detection operations thereof.

17. The method sensing apparatus of claim 16 further comprising configuring said peak detector reset circuit to comprise a plurality of logic gates that receive output pulses generated by said first and second sub-circuits, wherein said plurality of logic gates allow output signals indicative of speed to be generated only when decoded directional data associated with said target generated by said direction decoding circuit is equivalent to a previously decoded directional data associated with said target.

18. The method of claim 16 further comprising configuring said peak detector reset circuit to comprise:
  a reset counter wherein when said reset counter achieves a particular count, a reset signal is automatically applied to said peak detector reset circuit and said count is then incremented on each edge of output pulses generated by said first or second comparators of said respective first and second sub-circuits; and
  wherein said count is reset after each edge thereof that results from an alternate comparator output generated by said first or second comparators during a standard operating mode; and
  wherein when a particular number of consecutive non-alternating edges originate from a single comparator output of said first or second comparators, an indication that at least one of said first or second comparators is stalled and a need for an application of said peak reset signal to said peak detector reset circuit is necessary.

* * * * *